United States Patent
Abe

[11] Patent Number: 6,166,358
[45] Date of Patent: *Dec. 26, 2000

[54] HONEYCOMB HEATER IN A METALLIC CASING

[75] Inventor: Fumio Abe, Handa, Japan

[73] Assignee: NGK Insulators, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 09/150,676

[22] Filed: Sep. 10, 1998

[30] Foreign Application Priority Data

Sep. 18, 1997 [JP] Japan ................................. 9-253126

[51] Int. Cl.[7] ................................................... H05B 3/10
[52] U.S. Cl. ............................................ 219/552; 219/553
[58] Field of Search ............................ 219/552, 553; 392/485, 494; 422/174, 177, 179, 180; 60/300

[56] References Cited

U.S. PATENT DOCUMENTS

| | | | |
|---|---|---|---|
| 5,376,610 | 12/1994 | Takahata et al. | 502/66 |
| 5,463,206 | 10/1995 | Abe et al. | 219/553 |
| 5,526,462 | 6/1996 | Kondo et al. | 392/485 |
| 5,614,155 | 3/1997 | Abe et al. | 422/174 |
| 5,649,049 | 7/1997 | Abe et al. | 392/494 |
| 5,651,088 | 7/1997 | Abe et al. | 392/494 |
| 5,680,503 | 10/1997 | Abe et al. | 392/485 |
| 5,695,722 | 12/1997 | Myers et al. | 422/174 |
| 5,861,611 | 1/1999 | Kato et al. | 219/552 |

FOREIGN PATENT DOCUMENTS

| | | |
|---|---|---|
| 3-295184 | 12/1991 | Japan . |
| 4-241715 | 8/1992 | Japan . |
| 4-366584 | 12/1992 | Japan . |
| 7-259543 | 10/1995 | Japan . |
| 8-4521 | 1/1996 | Japan . |

*Primary Examiner*—Teresa Walberg
*Assistant Examiner*—Vinod D Patel
*Attorney, Agent, or Firm*—Parkhurst & Wendel, L.L.P.

[57] ABSTRACT

A heater unit includes a metallic casing, and a honeycomb heater held in the casing, comprising a metallic honeycomb structure having a large number of parallel passages extending in the direction of the flow of a gas passing through the heater unit and at least one electrode for electrical heating of the honeycomb structure, attached to the honeycomb structure. A fastening member is fitted to part of the outer surface of the honeycomb heater to stabilize the shape of the honeycomb heater and a holding member is fitted to the outer periphery of the honeycomb heater to connect the honeycomb heater with the inner surface of the casing via the holding member. This heater unit can be suitably used for purification of the exhaust gas emitted from an automobile engine, because, in the heater unit, the unpurified exhaust gas which passes through the gap between the casing and the honeycomb heater, i.e. the by-pass flow, is minimized.

17 Claims, 6 Drawing Sheets

HONEYCOMB HEATER IN A METALLIC CASING

BACKGROUND OF THE INVENTION

The present invention relates to a heater unit suitably used for purposes such as purification of exhaust gas emitted from an automobile engine or the like. Specifically, the present invention relates to a heater unit comprising a casing and a honeycomb heater held in the casing, wherein the unpurified exhaust gas pass through the gap between the casing and the honeycomb heater, i.e. the by-pass flow is minimized.

RELATED ART STATEMENT

In recent years, it has been pointed out that the nitrogen oxides (NOx), carbon monooxide (CO) and hydrocarbons (HC) contained in the exhaust gases emitted from internal combustion engines of automobiles, etc. cause diseases, air pollution, acid rain, etc. As a result, exhaust gas regulations have been intensified. In connection therewith, metallic honeycomb structures, in place of known porous ceramic honeycomb structures, have come to draw attention as a catalyst, a catalyst carrier or the like for purification of said substances in exhaust gases. Since the above harmful substances in exhaust gases are generated in large amounts during the cold start of an automobile engine, it is earnestly desired to develop, for example, a honeycomb heater capable of reducing the emission generated during the cold start of an engine.

As such a honeycomb structure, the present applicant proposed, in Japanese Patent Application Kokai (Laid-Open) No. 295184/1991, a honeycomb heater comprising a honeycomb structure and at least one electrode attached to the honeycomb structure, wherein a resistance-adjusting means (e.g. slits) are formed in the honeycomb structure between the electrodes and the outer peripheral portion of each slit is filled by a zirconia-based heat-resistant inorganic adhesive. The present applicant also proposed, in Japanese Patent Application Kokai (Laid-Open) No. 241715/1992, a method for fastening a honeycomb heater by covering the outer periphery (side) of the honeycomb heater with a metallic band via an insulating member such as ceramic mat, cloth or the like. Japanese Patent Application Kokai (Laid-Open) No. 241715/1992 also discloses the application of a ceramic coating onto the band or ring by, for example, thermal spraying of alumina or zirconia to form an insulating protective film on the band or ring.

Further in Japanese Patent Application Kokai (Laid-Open) No. 366584/1992, the present applicant disclosed a heater unit comprising a casing and a honeycomb heater having slits for resistance adjustment, held in the casing, wherein (1) a metallic spacer coated with an insulating ceramic is inserted into the outer peripheral portion of each slit and (2) the inner surface of the casing is coated as well with an insulating ceramic.

Each of the above proposals offers a method for insulating and protecting the resistance-adjusting means of a honeycomb heater. However, under the severe operating conditions (vibration and thermal impact) of automobiles, the honeycomb heater of Japanese Patent Application Kokai (Laid-Open) No. 295184/1991 may lead to the detachment of the inorganic adhesive; the honeycomb heater of Japanese Patent Application Kokai (Laid-Open) No. 241715/1992 may cause deformation resulting from either horizontal or vertical vibration, which may lead to the destruction of the spacer and wear of the insulating mat; and the honeycomb heater of Japanese Patent Application Kokai (Laid-Open) No. 366584/1992, although it is free from most of these problems, needs a ceramic coating in all areas which could afford electrical conduction. Additionally, it's insulation method is not easy to employ practically.

In order to address such problems, the present applicant proposed, in Japanese Patent Application Kokai (Laid-Open) No. 259543/1995, a heater unit comprising a metallic casing and an electrically heatable honeycomb heater held in the metallic casing via a metallic holding member, wherein at least one of the boundaries between the honeycomb heater and the holding member and the boundaries between the holding member and the casing has been subjected to an insulation treatment and the holding member can absorb the displacement of the honeycomb heater taking place in a direction vertical to the flow direction of exhaust gas and can fix the honeycomb heater against the flow of exhaust gas. In Japanese Patent Application Kokai (Laid-Open) No. 259543/1995, it is also described that the outer periphery of the honeycomb heater is provided with a ceramic mat in order to prevent the by-pass flow of exhaust gas.

The present applicant also proposed, in Japanese Patent Application Kokai (Laid-Open) No. 4521/1996, an improvement in the heater unit disclosed in Japanese Patent Application Kokai (Laid-Open) No. 259543/1995, that is, a flow-controlling means for keeping the by-pass flow of exhaust gas at 20% or less. Specifically, a heater unit wherein the distance between the casing and the outer surface of the honeycomb heater becomes 3 mm or less at the gas inlet and/or the side of the honeycomb heater was proposed.

The honeycomb heater disclosed in Japanese Patent Application Kokai (Laid-Open) No. 259543/1995 is superior in vibration resistance and thermal impact resistance but is not easy to produce because the metallic holding member must be connected to the metallic casing by welding or the like. Further in the above heater unit, the ceramic mat used for covering the outer periphery of the honeycomb heater for prevention of the by-pass flow of exhaust gas, has no provision for holding the honeycomb heater. Furthermore, although the degree differs depending upon how the ceramic mat is applied, the metallic holding member in the heater unit undergoes vibration during actual use of the heater unit and may cause wear. Thus, the heater unit of Japanese Patent Application Kokai (Laid-Open) No. 259543/1995, has room for improvement.

With respect to holding the honeycomb heater in the casing, the heater unit disclosed in Japanese Patent Application Kokai (Laid-Open) No. 4521/1996 uses the same concept as the heater unit of Japanese Patent Application Kokai (Laid-Open) No. 259543/1995 and further has a flow-controlling means for keeping the by-pass flow of exhaust gas at 20% or less; however, the heater unit makes no mention of a means to reduce the by-pass flow to around zero.

In addition to the above-mentioned problems of the prior art, the regulation of exhaust gas has become stricter in recent years and the requirements for exhaust gas purification during the cold start of engine have increased. Due to these changes, it is now desirable to minimize the by-pass flow of exhaust gas and force all exhaust gas to pass through the honeycomb heater. Hence, it is desirable to develop a heater unit which can be held in the casing by a simple method, satisfies the above conditions and further has the heat resistance, thermal impact resistance and vibration resistance which are necessary in severe operating conditions.

SUMMARY OF THE INVENTION

The present invention has been completed in order to alleviate the problems of the prior art and respond to the above-mentioned requirements.

According to the present invention there is provided a heater unit comprising:

a metallic casing, and a honeycomb heater held in the casing, comprising a metallic honeycomb structure having a large number of parallel passages extending in the direction of the flow of gas passing through the heater unit and at least one electrode for electrical heating of the honeycomb structure, attached to the honeycomb structure, in which a fastening member of the heater unit is fitted to part of the outer surface of the honeycomb heater to stabilize the shape of the honeycomb heater and a holding member is fitted to the outer periphery of the honeycomb heater to connect the honeycomb heater with the inner surface of the casing via the holding member.

In the heater unit of the present invention, it is preferred that the fastening member is fitted to the outer periphery (the side) and/or the periphery of face of the honeycomb heater. It is also preferred that the fastening member is made of a metal and that the fastening member and the honeycomb heater are insulated from each other via an insulating member. In the case of this invention, it is preferred that the fastening member is buried in a groove(s) formed at the side and/or the periphery of face, of the honeycomb heater and that the fastening member is fixed. It is also preferred that the fastening member consists of at least one ring, however, the fastening member may consist of multiple divided parts.

In the heater unit of the present invention, it is preferred that the holding member consists of an insulating inorganic filler. The inorganic filler is preferably a ceramic mat. The ceramic mat is held in the casing at a holding pressure of preferably 0.5 kg/cm$^2$ or more. The ceramic mat may be an expansion type or a non-expansion type with an expansion type being preferred because it provides superior holding power for the honeycomb heater at high temperatures. In the heater unit of the present invention, it is preferred that two or more honeycomb heaters are connected and held in the casing.

DETAILED DESCRIPTION OF THE INVENTION

Figure 1:
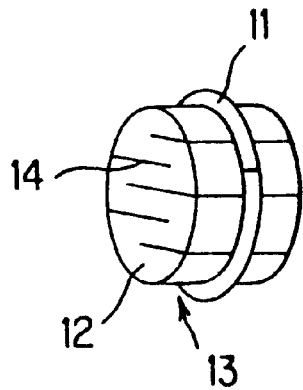
FIG. 1 is a perspective view showing an embodiment of the honeycomb heater provided with a fastening member of the present invention.

With the heater unit of the present invention, the amount of by-pass flow can be minimized and, as a result, an improved exhaust gas purification ability is obtained; further, the honeycomb heater can be held in the casing easily; furthermore, the present heater unit is superior in vibration resistance, heat resistance and the like under actual usage conditions.

The present invention is hereinafter described in detail with reference to the accompanying drawings. However, the present invention is in no way restricted to the following embodiments.

The heater unit of the present invention comprises a honeycomb heater composed of a metallic honeycomb structure having a large number of parallel passages and at least one attached electrode for electrical heating of the honeycomb structure. The honeycomb structure can be made of any metallic material which generates heat when electrified. In view of the conditions (e.g. high temperatures of automobile exhaust gas) to which the honeycomb structure is typically exposed, it is preferable that the honeycomb structure is made from a material which is superior in heat and oxidation resistance, such as a Fe—Cr—Al type composition.

With respect to the cell shape of the honeycomb structure, i.e. the passage sectional shape of the honeycomb structure in a direction vertical to the lengthwise direction of the passages, there is no particular restriction. However, in view of the thermal impact resistance required for the honeycomb structure, it is preferably a shape such as polygon (e.g. hexagon or higher polygon), corrugated shape or the like (which is more flexible to stretching or shrinkage than triangle or tetragon shapes). There is no particular restriction, either, with respect to the number of cells in the honeycomb structure. However, the number of cells is preferably 100 to 1,500 cells/in.$^2$ in view of the thermal conductivity and exhaust gas purification ability of the honeycomb structure. If the number of cells exceeds 1,500 cells/in.$^2$, there is a high possibility that a problem will arise due to a loss in pressure of the exhaust gas.

As for the honeycomb structure, a wound type structure can be constructed by attaching a corrugated sheet to rolled foil and winding, or an extrudate type can be made by powder metallurgy and extrusion, with the latter type being preferred from the standpoint of the structural durability. Typical examples of the honeycomb structure are shown in Japanese Patent Application Kokai (Laid-Open) No. 295184/1991 and WO 10471/1989.

At least one electrode for electrical heating of the honeycomb structure is attached to the honeycomb structure. In order to apply a desired amount of electric power to the honeycomb structure to generate the desired amount of heat therein, it is generally necessary to adjust the resistance of the honeycomb structure. Hence, in the case of the extrudate type honeycomb heater, it is preferable to form a resistance-adjusting means, for example, slits [described in Japanese Patent Application Kokai (Laid-Open) No. 295184/1991]. When such a honeycomb structure (a honeycomb heater) is used as a catalytic converter, a catalyst is generally loaded thereon. In the following examples, the descriptions are mainly based on honeycomb heaters having slits formed therein. The slits refer to all kinds of slits formed in a honeycomb heater for resistance adjustment, and may be linear or curved. With respect to the honeycomb heater in which slits are to be formed, there is no particular restriction as to the production method; and slits can be formed in any type of honeycomb structure, such as the wound type and an extrudate type, both mentioned above.

The honeycomb heater is accommodated in a metallic casing so that the lengthwise direction of the passages of the honeycomb heater are parallel with the direction of the flow of the exhaust gas passing through the casing. That is, the lengthwise direction of the passages of the honeycomb heater are parallel with the lengthwise (thickness) direction of the casing; consequently, the majority of the exhaust gas passes through the passages of the honeycomb heater. The casing is a cylinder into which the honeycomb heater can be inserted, and an example thereof is a metallic cylinder. The sectional shape of the casing in a direction vertical to the lengthwise direction is not restricted to a circular shape and can be appropriately determined so as to match the shape of the honeycomb heater.

In the present invention, in fixing the honeycomb heater in the casing, first a metallic or ceramic fastening member is fitted to the honeycomb heater. In many cases, when the honeycomb heater has slits formed therein, the slits often show expansion or shrinkage, making the external shape of the honeycomb heater unstable. Therefore, the fitting of the fastening member is used to stabilize the shape of the honeycomb heater, and moreover suppresses the movement (e.g. expansion or shrinkage) of slits. This in turn facilitates higher durability for the honeycomb heater.

FIG. 1 is a perspective view showing an embodiment of the honeycomb heater to which a fastening member is fitted. In FIG. 1, a ring-shaped fastening member 11 is fixed by being inserted into a groove 13 formed at the outer periphery (side) of a honeycomb heater 12. Slits 14 are formed in the honeycomb heater 12 for resistance adjustment.

Ceramic material (e.g. alumina) or a metallic material can be suitably used as the material for the fastening member 11. Since the material for the honeycomb heater 12 is generally a metal having a thermal expansion coefficient as large as $10 \times 10^{-6}$ to $20 \times 10^{-6}/°$ C., a metal having about the same thermal expansion coefficient is used as the material for the fastening member 11. By matching the thermal expansion coefficients of the two materials, it is possible to reduce the stress caused by the difference in thermal expansion coefficient between the fastening member 11 and the honeycomb heater 12.

For example, when the honeycomb heater 12 is made of ferrite, the fastening member 11 is preferably made of a heat-resistant steel such as ferrite, austenite or the like. Since the outer periphery of the honeycomb heater 12 has a lower temperature than the main portion (center) of the honeycomb heater 12, use of austenite having a high thermal expansion property can reduce the thermal stress generated between the honeycomb heater 12 and the fastening member 11. The fastening member 11 needs to have a heat resistance equivalent to that of the honeycomb heater 12 and is preferred to generally have a heat resistance of 600° C. or higher.

Figure 2:
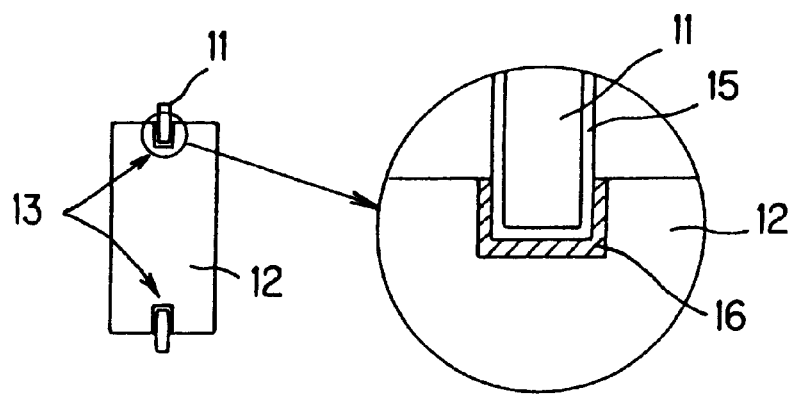
FIG. 2 is a sectional view showing an embodiment of the structure of the connection area between a fastening member of the present invention and a honeycomb heater.

When a metallic fastening member 11 is used, an insulating area must be formed at the boundary between the fastening member 11 and the honeycomb heater 12 to prevent them from making contact. Formation of such an insulating area can be achieved, for example, by, as shown in the sectional view of FIG. 2, forming an insulating film (e.g. a ceramic film) 15 on the outer surface of a fastening member 11 and then filling an insulator 16 between the fastening member 11 and the honeycomb heater 12.

Formation of the insulating film 15 on the fastening member 11 is conducted by thermal spraying, electrostatic coating, dipping or the like. In the case of the insulator 16, a heat-resistant inorganic adhesive, a heat-resistant mortar, a glassy cloth or the like is used. It is not always necessary to use both the insulating film 15 and the insulator 16, either of them may be used as long as insulation and durability are ensured between the fastening member 11 and the honeycomb heater 12.

Figure 3:
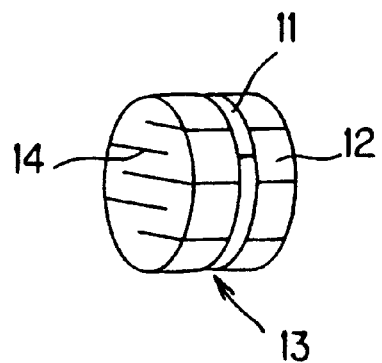
FIG. 3 is a perspective view showing another embodiment of the honeycomb heater provided with a fastening member of the present invention.

In the embodiment of FIG. 1, the fastening member 11 protrudes from the groove 13 formed at the outer periphery (side) of the honeycomb heater 12. However, a fastening member 11 may be buried in a groove 13 and fixed in a honeycomb heater 12, as shown in FIG. 3.

In FIG. 1, the fastening member 11 is shown as a single ring. In actual production, the fastening member 11 ordinarily consists of two or more parts which are connected and attached to the outer periphery groove 13 of the honeycomb heater 12. These multiple parts need not be bonded at the boundaries by welding or the like as long as they can be securely fastened to the casing of the honeycomb heater 12.

Figure 4:
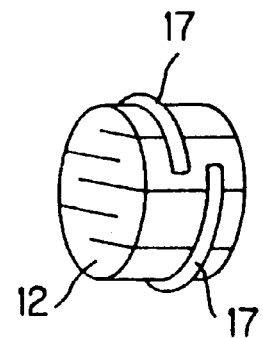
FIG. 4 is a perspective view showing another embodiment of the honeycomb heater provided with a fastening member of the present invention.
Figure 5:
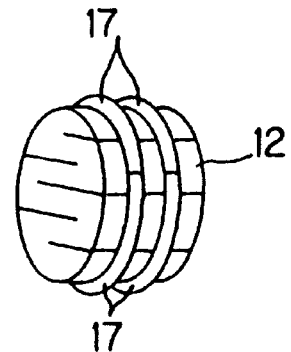
FIG. 5 is a perspective view showing another embodiment of the honeycomb heater provided with a fastening member of the present invention.

Therefore, it is also possible, as shown in FIG. 4, to provide, for example, two half rings 17 at positions which differ in lengthwise (thickness) direction to the honeycomb heater 12 as fastening members at the outer periphery (side) of a honeycomb heater 12. It is also possible, as shown in FIG. 5, to provide four half rings 17 at two positions of the outer periphery (side) of a honeycomb heater 12.

In fitting the fastening member to the honeycomb heater, it is also possible to force a honeycomb heater into a one-piece ring a s fastening member to allow the honeycomb heater to have a stable shape. In this case, however, the insulation and fitting between the ring and the honeycomb heater may be insufficient.

Figure 6:
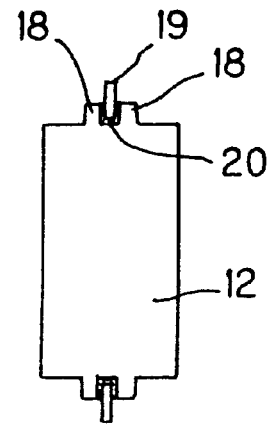
FIG. 6 is a sectional view showing another embodiment of the structure of the connection area between a fastening member of the present invention and a honeycomb heater.
Figure 7:
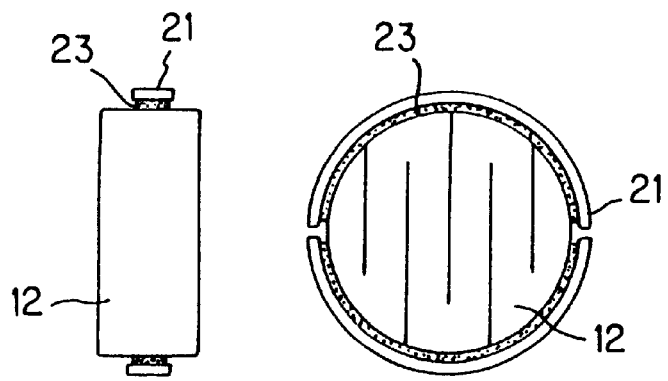
FIG. 7 is a sectional view showing another embodiment of the structure of the connection area between a fastening member of the present invention and a honeycomb heater.

FIG. 6 is a sectional view showing another method for fitting a fastening member to a honeycomb heater. In this case, a fastening member 19 is held between two projections 18 provided at the outer periphery (side) of a honeycomb heater 12, with, for example, a heat-resistant adhesive 20. FIG. 7 is a sectional view showing a state in which a ring-shaped fastening member is bonded to the outer periphery (side) of the honeycomb heater by means such as brazing. In this case, in order to secure the insulation between a fastening member 21 and a honeycomb heater 12, it is necessary to form an insulating layer (not shown) inside the brazed area 23.

Figure 8:
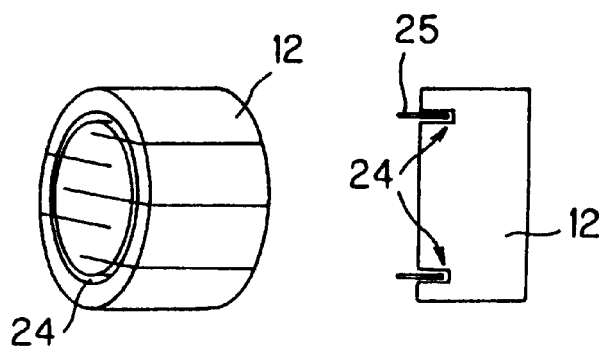
FIG. 8 is a perspective view and a sectional view both showing another embodiment of the structure of the connection area between a fastening member of the present invention and a honeycomb heater.

In the above, embodiments of fitting a fastening member to the outer periphery (side) of a honeycomb heater have been described. In the present invention, however, the position for fitting the fastening member is not restricted to the outer periphery (side) of the honeycomb heater. For example, as shown in FIG. 8, it is possible to form a ring-shaped groove 24 in a honeycomb heater 12 in the lengthwise (thickness) direction (the end is hereinafter referred to simply as face) of the area close to the outer periphery (side) at the end of the honeycomb heater 12, i.e. at the periphery of face, and fix a ring-shaped fastening member 25 matching the groove 24, into the groove 24. The groove 24 is formed preferably at a position between half of the radius of the honeycomb heater 12 and the periphery of face, and more preferably outside of the honeycomb heater portion which generates a substantial amount of heat. In holding such a honeycomb heater 12 in a casing, the fastening member 25 may be fitted into the honeycomb heater 12 at the exhaust gas-incoming side or the exhaust gas-exiting side. The fastening member 25 may be fitted to one face or both faces of the honeycomb heater 12. Thus, the fastening member 25 can be fitted to any position of a honeycomb heater 12 as long as the position is at the outer surface of the honeycomb heater 12 and there is no reduction in catalytic performance.

Figure 9:
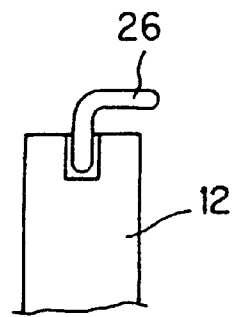
FIG. 9 is a sectional view showing another embodiment of the structure of the connection area between a fastening member of the present invention and a honeycomb heater.

The above-mentioned fastening member is a platy ring having a tetragonal sectional shape in a direction parallel to the thickness direction of the ring. There is no particular restriction as to the sectional shape, and the sectional shape may also be circular, polygonal or the like. For example, a ring-shaped fastening member 26 having a nearly L-shaped section, such as shown in FIG. 9 may be used with no problem. The overall shape of the fastening member can be determined so as to match the shape of the honeycomb heater to which the fastening member is fitted.

Thus, there is no restriction as to the structure of the fastening member as long as the fastening member can allow the honeycomb heater to have a stable shape. Therefore, the shape of the fastening member can be manipulated in order to match the properties of a holding member provided at the outer periphery (side) of the honeycomb heater.

When the holding member (description thereof follows) is, for example, a ceramic mat, if the fastening member has a complicated shape, the fastening member is superior in holding the ceramic mat but tends to damage the mat. When the holding member is an inorganic adhesive or a heat-resistant mortar, if the fastening member is a ring-shaped fastening member 26 having a nearly L-shaped section as shown in FIG. 9, the portion of the fastening member 26 bent in the lengthwise direction of a honeycomb heater 12 functions as an anchor to the holding member, whereby the fastening member 26 and the holding member can be strongly secured. In view of the production cost of the fastening member 26, a simple ring-shaped fastening member is preferred to the ring-shaped fastening member 26 having a nearly L-shaped section.

In the present invention, a honeycomb heater as mentioned above is held in a casing by using a holding member, whereby a heater unit is constituted. The holding member not only holds the honeycomb heater in the casing, but also serves to prevent the by-pass flow of exhaust gas through the gap between the outer periphery (side) of the honeycomb heater and the inner surface of the casing. Therefore, the holding member is required to restrict gas permeability, or substantially reduce gas permeability when used in a heater unit. Further, the holding member is required to have a pressure necessary to hold the honeycomb heater securely to the side and protect it against external forces (i.e. vibration and exhaust gas pressure) applied to the heater unit. As the holding member satisfying such requirements, there can be mentioned a ceramic mat of thermal expansion type or thermal non-expansion type, a cloth, a sleeve, and a heat-resistant inorganic adhesive made of silica-alumina, silica, alumina, zirconia or the like.

Of these holding members, a ceramic mat, a cloth, a sleeve, etc. provide superior protection from mechanical impacts such as stone hitting and the like to the honeycomb heater. A ceramic mat is best in view of it's holding power. For the ceramic mat, there can be suitably used a mat made of a heat-resistant glass of silica-alumina type, alumina type, alumina-mullite type or mullite type; a mat made of a ceramic fiber (of nonexpansion type); or a mat made of said ceramic fiber containing a given amount of a mineral (e.g. vermiculite), which expands at high temperatures (i.e. an expansion type mat). Suitable specific examples of the nonexpansion type mat are SUFFIL of 3M Co. and Maftec of Mitsubishi Chemical Corporation. Suitable specific examples of the expansion type mat are INTERAM of 3M Co. and EXPANDING PAPER of Carborandum Co.

When a ceramic mat is used as the holding member, the pressure necessary for the holding member to hold the honeycomb heater is 0.5 kg/cm$^2$ or more, preferably 2 kg/cm$^2$ or more. This holding pressure is set at an appropriate level, depending upon (1) the pressure applied to the honeycomb heater, determined by it's weight and the acceleration of vibration, (2) the pressure of exhaust gas, (3) the sectional area of honeycomb heater, and (4) the force for holding the honeycomb heater, determined by the frictional coefficient and contact area between the holding member and the honeycomb heater.

When a heater unit comprising a honeycomb heater is provided below the manifold of automobile, the holding pressure is preferably 2 kg/cm$^2$ or more in order to assure the heater unit can withstand a vibration of 60 G. When the heater unit is provided under the floor of automobile (in this case, vibration is relatively mild), a holding pressure of 0.5 kg/cm$^2$ or more can sufficiently withstand normal operation. There is no particular restriction as to the upper limit for holding pressure. However, it is not advisable to apply unnecessarily sizeable force as this may cause the deformation of the honeycomb heater or the casing. The upper limit of the holding pressure is ordinarily set at 20 kg/cm$^2$ or less. The holding member is fitted by a known technique such as ordinary stuffing, tourniquet, clamshell or the like. In order to secure the necessary holding power for a honeycomb heater, it is preferred to fix the honeycomb heater in the casing by applying pressure to the holding member. It is also possible to more securely bond, while applying pressure to the holding member, the boundary between the holding member and the honeycomb heater and/or between the holding member and the casing, by using a heat-resistant adhesive or the like.

Figure 10:
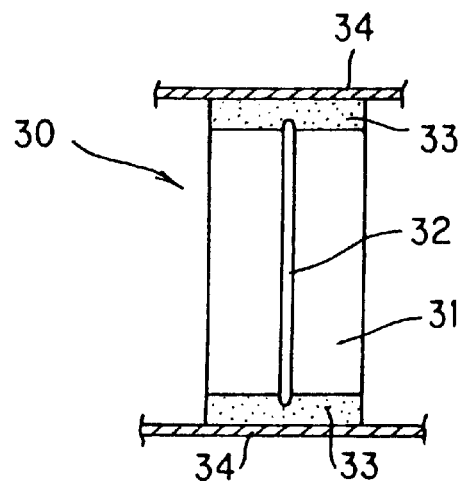
FIG. 10 is a sectional view showing an embodiment of the heater unit of the present invention.

FIGS. 10 to 15 described below show sectional views of various structures of the heater unit constituted by holding a honeycomb heater in a casing using a ceramic mat as a holding member. FIG. 10 shows a heater unit 30 wherein a fastening member 32 is fitted to the outer periphery (side) of a honeycomb heater 31 and the resulting material is fitted to the inner surface of a casing 34 using a holding member 33. Here, the fastening member 32 projects out from the outer periphery of the honeycomb heater 31; however, the fastening member 32 may be buried in a groove formed in the honeycomb heater 31, as seen in FIG. 3.

Figure 11:
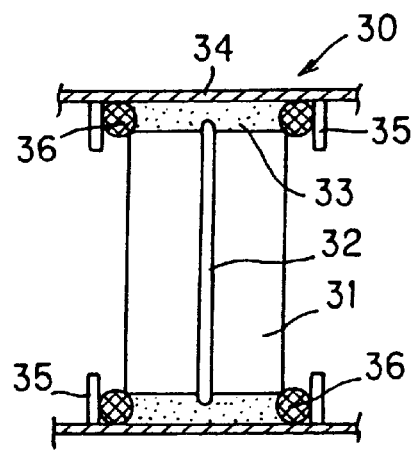
FIG. 11 is a sectional view showing another embodiment of the heater unit of the present invention.

FIG. 11 shows a heater unit 30 wherein supporting members 35 are used in a casing 34 to prevent a holding member 33 from being moved or eroded. Use of the supporting members 35 is necessary particularly when the holding member 33 is a ceramic mat of thermal non-expansion type. In a heater unit having such a structure, it is preferable to also use, as necessary, a ceramic sealing material 36 (for example, a material obtained by wrapping a stainless steel wire in a heat-resistant glass fiber) in the vicinity of the supporting members 35, because this can prevent the holding member 33 from being eroded by the exhaust gas passing through the heater unit. The fitting of the supporting members 35 to the inner surface of the casing 34 can be conducted by fixing, in the casing, a honeycomb heater 31 to which a fastening member 32 has been fitted, then applying the ceramic sealing material 36, and welding the supporting members 35 to the inner surface of the casing 34.

Figure 12:
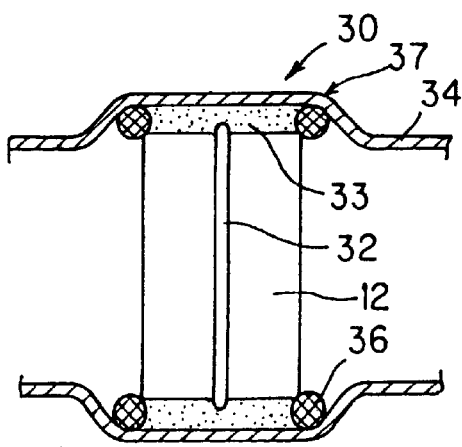
FIG. 12 is a sectional view showing another embodiment of the heater unit of the present invention.
Figure 13:
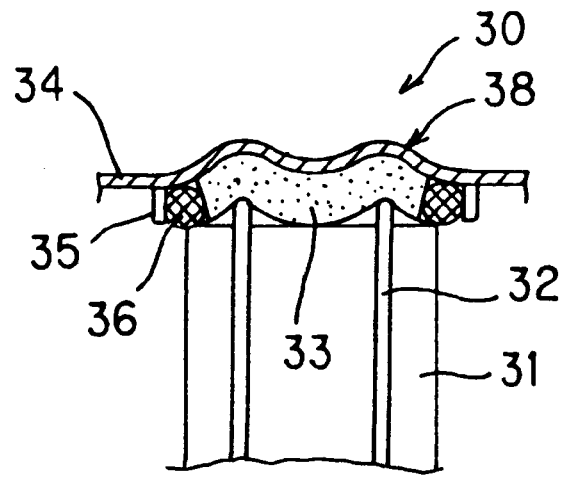
FIG. 13 is a sectional view showing another embodiment of the heater unit of the present invention.

FIG. 12 shows the structure of a heater unit 30 wherein a casing 34 has tapered portions 37 in the vicinity of the faces of a honeycomb heater 31. This is similar to the structure of FIG. 11, a ceramic sealing material 36 is provided at the ends of a holding member 33. In this heater unit structure as well, the same effect as the structure in FIG. 11 is obtained. FIG. 13 shows the structure of a heater unit 30 wherein a casing 34 has projections 38 at the casing positions close to fastening members 32. Even if only a single projection 38 is used, the holding power of a holding member 33 to a honeycomb heater 31 is increased. Formation of two (shown in FIG. 13) or more projections 38 are ideal, though, since they provide particularly strong holding power.

Figure 14:
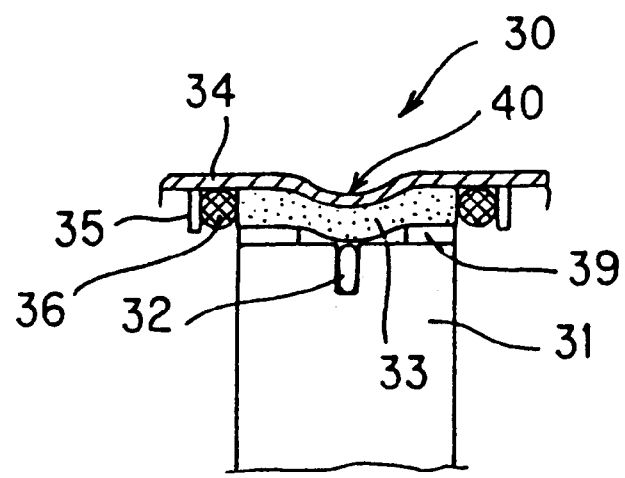
FIG. 14 is a sectional view showing another embodiment of the heater unit of the present invention.

FIG. 14 shows a heater unit 30 wherein a reinforcing material 39 is used on the areas close to the faces of the outer periphery (side) of a honeycomb heater 31, and wherein a casing 34 has a dent 40 at a position close to the fastening member 32. In this heater unit as well, the same increased holding power for the honeycomb heater as in the heater unit of FIG. 13 can be obtained. The above-mentioned tapered portions 37, projections 38 and dent 40 can be easily formed by press molding. In each of the heater units of FIGS. 13 and 14, similar to the case of the heater unit of FIG. 11, supporting members 35 and a ceramic sealing material 36 are provided for the enhancement of holding power for honeycomb heater 31 and for the prevention of erosion of the holding member 33.

Figure 15:
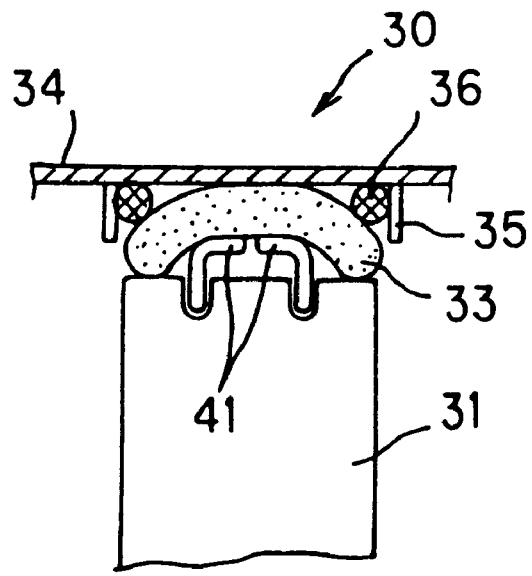
FIG. 15 is a sectional view showing another embodiment of the heater unit of the present invention.

FIG. 15 shows a heater unit 30 wherein two ring-shaped fastening members 41 each having a nearly L-shaped section are fitted to the outer periphery (side) of a honeycomb heater 31; a holding member (a ceramic mat) 33 covers and holds the outer periphery (side) of the honeycomb heater 31 and it's supporting members 35, and ceramic sealing materials 36 are used. The ceramic sealing material 36 is filled into the gap formed by the supporting members 35, a casing 34, and the holding member 33. The ceramic mat as a holding member can be replaced by a conductive material such as inexpensive wire mesh or the like when sufficient insulation is securable between the honeycomb heater 31 and the casing 34 of the holding member 33.

Figure 16:
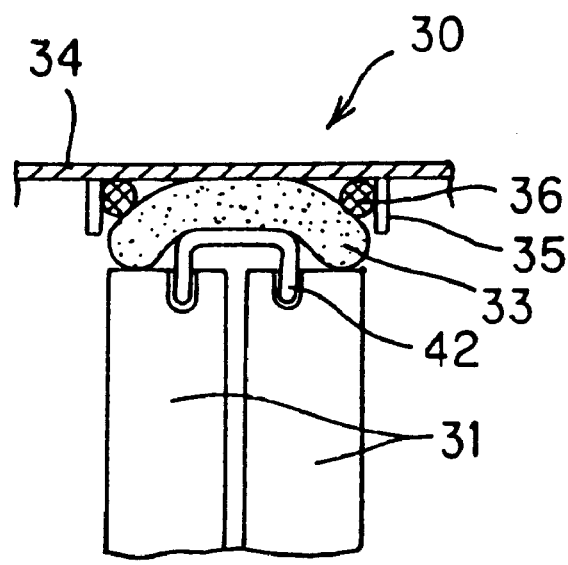
FIG. 16 is a sectional view showing another embodiment of the heater unit of the present invention.

Next, FIG. 16 shows a heater unit 30 wherein two honeycomb heaters 31 are integrated into one piece by the use of a ring-shaped fastening member 42 having a nearly L-shaped section and the resulting material is fitted to the inner surface of a casing 34 by the use of a holding member 33, supporting members 35, and a ceramic sealing material 36. Thus, by providing, in a heater unit 30, a plurality of honeycomb heaters 31 parallel to the direction of flow of exhaust gas, control of catalytic performance is made possible. The individual honeycomb heaters 31 are connected by a plate-shaped conductive material which is not shown in FIG. 16.

Embodiments of the present invention have been described in detail. Needless to say, the present invention is in no way restricted to these embodiments. It should be understood that various changes, modifications, improvements, etc. can be made based on the knowledge of those skilled in the art, as long as they do not depart from the scope of the present invention.

As stated above, in the heater unit of the present invention comprising a honeycomb heater and a casing therefore, the honeycomb heater has high shape stability and high durability because a fastening member is fitted to the honeycomb heater. Further, since the honeycomb heater fitted with a fastening member is fixed to the inner surface of the casing by the use of a holding member, the honeycomb heater is, through a simple procedure, securely fixed to the casing and the by-pass flow of the exhaust gas passing through the gap formed between the honeycomb heater and the casing essentially becomes zero. When a heater unit such as that of the present invention is mounted on an automobile, substantial results are obtained such as excellent exhaust gas purification during cold start, high heat resistance, high thermal impact resistance and high vibration resistance.

What is claimed is:
1. A heater unit comprising:
a metallic casing, and
a honeycomb heater held in the casing, comprising a metallic honeycomb structure having a large number of parallel passages extending in the direction of the flow of a gas passing through the heater unit and at least one electrode for electrical heating of the honeycomb structure, attached to the honeycomb structure,
in which a fastening member is fitted to part of the outer surface of the honeycomb heater to stabilize the shape of the honeycomb heater and a holding member is fitted to the outer periphery of the honeycomb heater to connect the honeycomb heater with the inner surface of the casing via the holding member,
wherein the fastening member is located in at least one groove formed at the side of the honeycomb heater and fixed.
2. A heater unit according to claim 1, wherein the fastening member is made of a metal and the fastening member and the honeycomb heater are insulated from each other via an insulating member.
3. A heater unit according to claim 1, wherein the fastening member comprises at least one ring.
4. A heater unit according to claim 1, wherein the fastening member comprises a plurality of parts.
5. A heater unit according to claim 1, wherein the holding member comprises an insulating inorganic filter.

6. A heater unit according to claim 5, wherein the insulating inorganic filter comprises a ceramic mat.

7. A heater unit according to claim 6, wherein the ceramic mat is held in the casing at a holding pressure of $0.5 \text{ kg/cm}^2$ or more.

8. A heater unit according to claim 6, wherein the ceramic mat is an expansion type or a nonexpansion type.

9. A heater unit according to claim 1, wherein two or more honeycomb heaters are connected and held in the casing.

10. A heater unit according to claim 1, further comprising a sealing material located near a supporting member, wherein said supporting member helps prevent the holding member from being moved or eroded.

11. A heater unit according to claim 1, wherein said metallic casing has tapered portions located near two faces of the honeycomb heater.

12. A heater unit according to claim 1, wherein said metallic casing has at least one projection at a position adjacent said fastening member.

13. A heater unit according to claim 1, wherein said metallic casing has an indentation at a position adjacent the fastening member.

14. A heater unit according to claim 1, wherein the fastening member is fixed by an insulator.

15. A heater unit according to claim 1, wherein the fastening member is fixed by an insulator, wherein said insulator comprises an inorganic adhesive.

16. A heater unit according to claim 1, wherein the fastening member is located in at least one groove formed at the periphery of a face of the honeycomb heater and fixed.

17. A heater unit according to claim 1, wherein the fastening member is located in at least one groove formed at the side and the periphery of a face of the honeycomb heater and fixed.

* * * * *